July 12, 1960   R. R. FONTAINE ET AL   2,944,347
HYDRAULIC PRESSURE SIMULATION
Filed March 31, 1958   2 Sheets-Sheet 1

*PRIOR ART*

INVENTORS.
ROBERT R. FONTAINE,
CLYDE M. WHITBY
HOSEA D. WHITE, JR.

BY Donald P. Smith
ATTORNEY

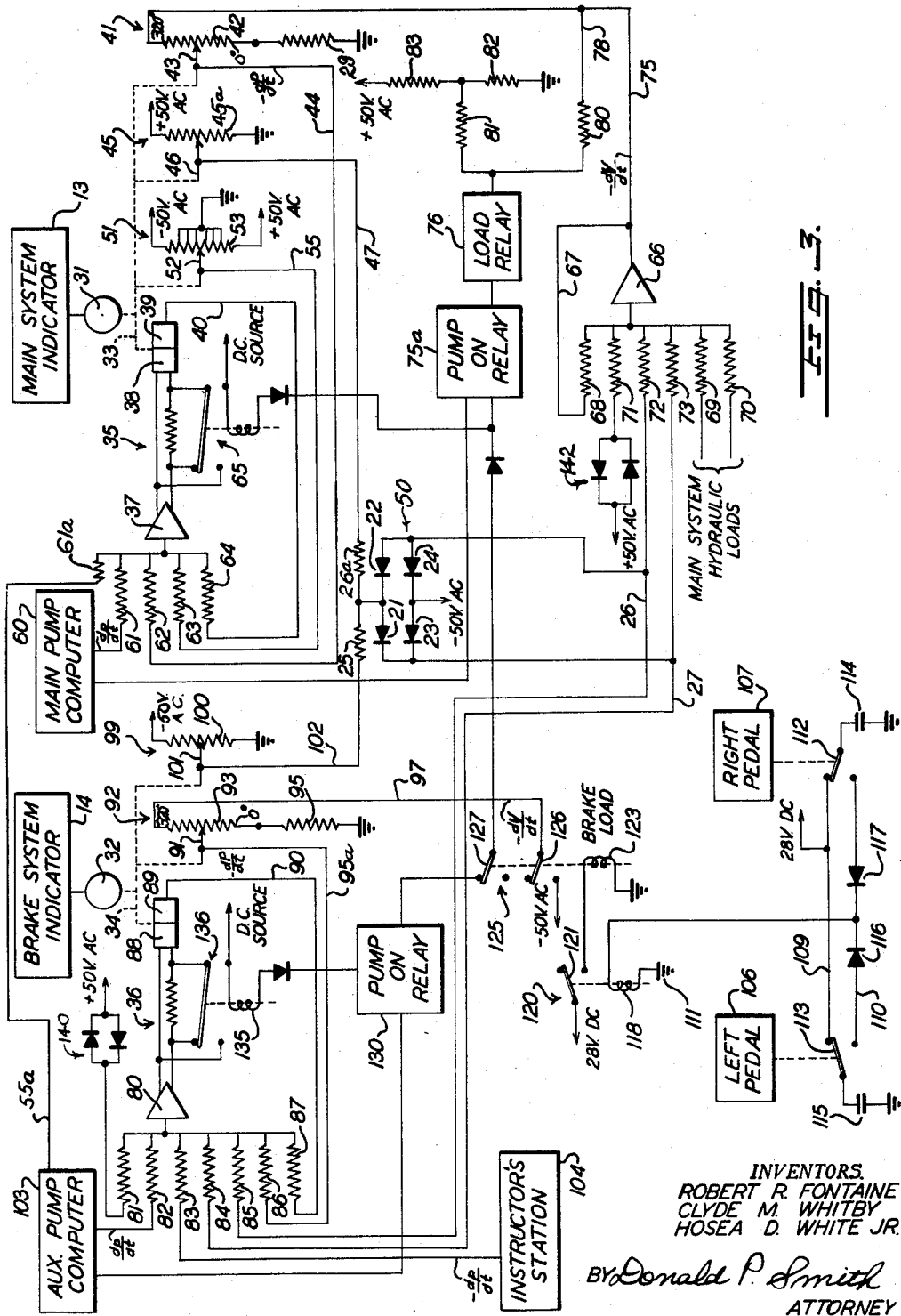

United States Patent Office 2,944,347
Patented July 12, 1960

2,944,347

HYDRAULIC PRESSURE SIMULATION

Robert R. Fontaine, East Riverdale, Clyde M. Whitby, Beltsville, and Hosea D. White, Jr., Greenbelt, Md., assignors to ACF Industries, Incorporated, New York, N.Y., a corporation of New Jersey Filed Mar. 31, 1958, Ser. No. 725,082

2 Claims. (Cl. 35—12)

This invention relates generally to ground flight simulators of the type used to train student pilots in the operation of an aircraft, and more particularly to a system to simulate to the student the operation of the aircraft hydraulic system during loading and pressure build-up cycles.

The usual aircraft has a dual hydraulic system, the main system usually supplies loads such as the flaps, landing gear, and the like and has a pressure indicator and a pump supplying pressure to an accumulator, such pump being arranged to run and stop upon system demand. A separate brake hydraulic system is then provided in the interest of safety, such system having its own pressure indicator and accumulator. The accumulators for the two systems are interconnected through a non-reversible valve connected in a line joining between them so that the main system will supply all loads including the brake load, and oil under pressure will flow from the main accumulator into the brake accumulator, thereby allowing brake actuation when demanded. Fluid cannot flow from the brake accumulator to the main accumulator. As an additional safety factor, an auxiliary pump is provided to aid the main pump if the load becomes excessive, and a valve arrangement is provided whereby the auxiliary pump can be connected to supply the brake system, per se, or to supply fluid under pressure to the main accumulator.

As will later be more fully pointed out, this invention provides a circuit to realistically indicate to the student pilot the dynamic behaviour of such a system.

It is, accordingly, a broad object of this invention to provide a circuit to accurately simulate the hydraulic system of an aircraft.

It is a more specific object of this invention to provide a circuit wherein a plurality of derived voltages represent hydraulic loads and a further series of derived voltages represent pressures in the system, and an indicator reveals to a student the value of the system pressure during simulated flight.

It is a further object of this invention to provide, in a simulated hydraulic system, a pair of instruments respectively representing to a student main accumulator pressure and brake accumulator pressure and a pair of interconnected servo loops to drive the instruments for representing the system behaviour.

It is a more distinct object of this invention to provide, in a system for simulating an aircraft hydraulic system, an electrical circuit to sense a position differential between a pair of servo shafts respectively responsive to varying conditions and to derive a voltage responsive to such differential to tend to balance the position of the servo shafts only under predetermined conditions (simulation of hydraulic check valve).

Further objects will be in part explained and in part obvious from the following specification in which:

Fig. 3 is a schematic wiring diagram showing the details of the circuit which simulates the system of Figs. 1 and 2.

This invention comprises a circuit for simulating to a student, during a training cycle, the dynamic and static behaviour of an hydraulic pressure system of the type having a main and a brake accumulator interconnected for non-reversible flow to thereby equalize the simulated pressure when the brakes are used only if the main hydraulic pump is operating and consists of a pair of indicating instruments to represent to the student the main and brake accumulator pressure respectively, a pair of servo loops including respective motors connected to drive the particular instruments, and a circuit connected to each servo loop to derive signals to simulate hydraulic loads to tend to operate the motors in a pressure decreasing direction, together with a circuit to derive signals to simulate pump operations to tend to operate the motors in a pressure increasing direction.

Figure 1:
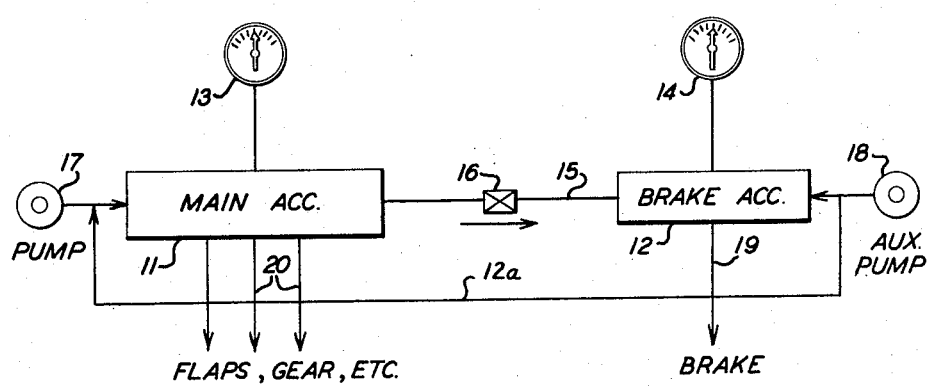
Fig. 1 is a schematic representation of a prior art actual hydraulic system.

Referring now to the drawings wherein the actual aircraft system is in part shown; in Fig. 1, reference character 11 indicates the main accumulator, and reference character 12 indicates the brake accumulator each having pressure gauges 13 and 14 communicating therewith. Conduit 15 having therein non-reversible valve 16, joins between the accumulator pair and pump 17 supplies pressure to the main accumulator 11, and pump 18 optionally supplies pressure to the brake accumulator or to the main accumulator through conduit 12a. A selector valve (not shown) permits the operator to connect the auxiliary pump to either accumulator as additional capactiy is needed. Conduit 20 supplies respective system loads such as flaps, landing gear and the like. If pump 18 is not used and a pressure differential develops between accumulators 11 and 12, then valve 16 permits a flow of fluid under pressure into accumulator 12 to insure proper brake operation. Opposite flow is not permitted.

Figure 2:
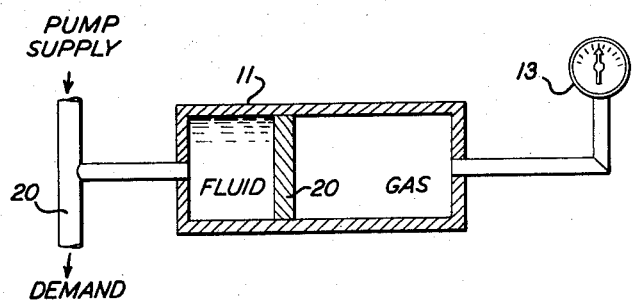
Fig. 2 is a cross section view of a part of the actual system of Fig. 1 showing a typical accumulator.

The Fig. 2 detail shows a schematic of an actual accumulator such as 11 having a slidable piston 20 therein and the beforementioned pressure guage 13 mounted within the field of vision of the pilot so that he may be aware of the condition of the systems. The supply and demand conduits 20 are there shown as a continuous member. The gas volume to the right of slidable piston 20 is preloaded in the aircraft to a value of 2000 p.s.i when zero pressure exists in conduit 20. The volume of the container is so selected that with full system pressure appearing on the left of the piston, the gas pressure on the right is 3000 p.s.i. Gauge 13, then, actually measures pressure over a 1000 p.s.i. range.

The natural laws which apply to this type of accumulator will now be briefly discussed. In general, the range of pressures involved here is such that the gas in the accumulator will approximately follow the law:

$$PV = MRT$$

where:

$P$ = pressure in pounds per square inch;
$V$ = volume of gas in cubic inches;
$M$ = moles of gas;
$R$ = universal gas consonant;
$T$ = temperature.

The simulation assumes that T is a constant, since pressure changes quite slowly and T does not change significantly due to changes in hydraulic pressure. M is a constant, because the accumulator is sealed and no gas can escape.

Then: $PV=K$ where K is a constant equal to MRT. Differentiating with respect to time:

$$\frac{dV}{Pdt}+\frac{dP}{Vdt}$$

and $$\frac{dP}{dt}=\frac{-P}{V}\frac{dV}{dt}=\frac{P}{V}\left(\frac{dV}{dt}\right)$$

When $dV/dt$ is negative, the gas volume is decreasing, the pressure is increasing, and the fluid is flowing into the accumulator. When $dV/dt$ is positive, the fluid is flowing out of the accumulator. The former case indicates charging the accumulator, while the latter case indicates discharging the accumulator.

In the circuit to be described, derived voltages representing positive $dP/dt$ (hydraulic supply) are applied directly to the input of servo mechanisms through properly scaled resistors. Voltages representing negative $dP/dt$ (hydraulic loads) are derived by taking the $dV/dt$ due to each load, summing them, multiplying the sum by an approximation of $P/V$ and obtaining $$\frac{dP}{dt}$$

to be applied to the input of the servo mechanisms through their respective scaling resistors. The servos integrate the sums of $$+\frac{dP}{dt} \text{ and } -\frac{dP}{dt}$$

to get P (accumulator pressure). The ratio $P/V$ is approximated by potentiometers 41 and 92 (see Fig. 3) having resistors 29 and 95 between the low voltage end of their windings 42 and 93 and ground. The resistor and winding valves are so chosen that, for example:

Vol. of accumulator at preload pressure=
(Vol. of accumulator at 3000 p.s.i.)

$$\frac{\text{p.s.i. equivalent to 0° shaft (42+29)}}{\text{p.s.i. equivalent to 320° shaft (29)}}$$

Where the p.s.i. equivalent to 0° shaft=preload pressure (2000 p.s.i.), and p.s.i. equivalent to 320° shaft =3000 p.s.i.

The circuit of Fig. 3 is scaled to a maximum of ±50 v. A.C. and shows the details of the simulated hydraulic system. The several indicators 13 and 14 are located in the vicinity of the student pilot so that he will be aware of the behaviour of the system during simulated flight. Synchros 31 and 32 are standard and are respectively connected to drive the moving elements of the pair of indicators from shafts 33 and 34 of servo mechanisms, 35 and 36. The simulated main hydraulic system servo will be described first. As there shown, an amplifier 37 having a plurality of input resistors feeds a servo motor 38 coupled to generator 39. The common shaft of the motor generator set is connected to shaft 33, the position of which, as will later be more fully explained, is analogous to main system pressure. Connector 40 is the rate feedback conductor which provides an input to amplifier 37 through resistor 64 proportional to the rate at which shaft 33 moves for purposes of stability. Potentiometer 41 having a resistance winding 42 scaled in accordance with accumulator pressure and a wiper arm 43 driven by shaft 33 is electrically connected to line 44 and to the input resistor 62 of amplifier 37. A second potentiometer 45 has a wiper arm 46 driven from shaft 33 and is connected by conductor 47 to a phase selector circuit 50. A third potentiometer 51, providing electrical stops for the limiting position of shaft 33, has wiper arm 52 driven from shaft 33 and a resistance winding 53 having substantially most of its turns connected to ground and equal and oppositely phased voltages applied to the respective upper and lower terminals. Connector 55 joins the wiper arm to the input resistor 63 of amplifier 37.

The voltages tending to drive shaft 33 in a direction to represent increasing pressure on indicator 31 are derived from simulated main pump computer 60 which may, for example consist of a signal source to apply predetermined voltage levels (not more than 50 v. A.C.) representing $dP/dt$ to resistor 61 in the input of amplifier 37. Switches (not shown) are provided to be controlled by the student pilot so that unless he turns the system on, the main indicator will remain at the preload position. Scaling resistors 62, 63 and 64 respectively proportion the input voltages so that they are summed and fed into the amplifier 37 to thereby represent simulated hydraulic circuit conditions. A relay 65 short circuits the motor input when its armature is pulled to the downward position.

The derived voltage tending to operate servo 35 in a direction to drive shaft 33 in a simulated pressure decreasing $$\left(-\frac{dP}{dt}\right)$$

direction are obtained from amplifier 66 having a feedback connection 67 and a series of inputs designated "main system simulated hydraulic loads" which may be the landing gear, spoilers, flaps, etc., and are derived from the main flight computer of the trainer and connected to resistors 69 and 70 to scale the several input values. The purposes of the three remaining input resistors 71, 72, and 73 will be later explained. The output voltage of amplifier 66

$$\left(-\frac{dV}{dt}\right)$$

is applied to conductor 75 and to the resistance winding 42 of potentiometer 41. The potentiometer multiples the $$\left(-\frac{dV}{dt}\right) \text{ by } (P/V)$$

and a voltage representing $$-\frac{dP}{dt}$$

is connected by conductor 44 to amplifier 37.

A pair of relays 75a and 76 are provided to prevent drift of shaft 33 during periods when the simulated pumps are off and there is no load. Relay 76 senses the output of amplifier 66 through connection 78, joined to connector 75 and through a net work consisting of resistors 80, 81, 82, 83 and a source of A.C. voltage so that when there is no simulated load output, relay 76 operates to apply a ground to relay 75. If computer 60 is off, then relay 75 closes and the ground is applied to relay 65, pulling the armature down and shorting the input to motor 38. Thus, the indicator cannot drift during pre-flight procedures and check-outs where all pumps and loads are off and the indicator must remain stationary.

The simulated brake system servo, designated by reference character 36, will now be described. As in the previous system, summing amplifier 80 receives a plurality of inputs through scaling resistors 81 to 87, inclusive and drives a motor 88 coupled to a generator 89 which, through lead 90, returns its output through scaling resistor 87 to the input of amplifier 80 in the well known way. Shaft 34 drives the moving element of indicator 14 through synchro 32 and the wiper arms 91 and 101 of potentiometers 92 and 99, respectively. The resistance winding 93 is scaled in accordance with simulated brake pressure and has a series resistor 95 connected to ground. Conductor 95a connects the voltage developed by wiper arm 91 to the input of amplifier 80 through resistor 86.

Voltages to tend to drive shaft 34 in a direction to represent increasing pressures are derived at resistors 84 and 85 and in computer 103 which has a switch (not shown) under the control of the student pilot and may consist of a signal source of voltage levels representing *dp/dt* optionally connected to resistor 82 or through conductor 55a to input resistor 61a of main system amplifier 37. A control 104 is also provided at the instructor's station to connect a source of derived voltage representing $$-\frac{dP}{dt}$$

to simulate the condition of pressure failure. This voltage is applied to the input of summing amplifier 80 through resistor 83.

In the simulated cockpit of the trainer is disposed a pair of pedals 106 and 107 which the pilot depresses to apply the brakes before landing to check the condition of the hydraulic system and after landing to stop the plane. A source of direct current voltage is applied to conductor 109 and the circuit is completed to ground through a pair of condensers 114 and 115 and a pair of cam operated switches 112 and 113 which are closeable by the operation of the respective right and left brake pedal by the student pilot. In the positions there shown, the condensors charge to the full D.C. voltage. When one or both of the switches are closed by the foot pedals, one or both of the condensors discharge through diodes 16 and 117 through operating coil 118 of relay 120, thereby bringing the armature 121 down and energizing operating coil 123 of relay 125. When armature 126 reaches its lower position, a momentary pulse from a negative source of alternating current voltage is applied to the resistance winding 93 of potentiometer 92 and is there multiplied by *P/V* and the resultant $$-\frac{dP}{dt}$$

is applied to conductor 95a and resistor 86 to the input of summing amplifier 80, which tends to run the shaft 34 in a pressure decreasing direction. When the pilot depresses the simulated brake pedals, the simulated load causes a momentary dip in the pressure readings of both indicators, thus realistically reproducing the condition of hydraulic circuit testing which pilots perform prior to landing. This dip is caused by the direct application of the brake load through lead 97 and potentiometer wiper 91 to amplifier 80 which results in shaft motion and momentary change of position of potentiometer 92, which in turn is reflected through sensing network 50 in a motion of shaft 33 to a momentary lower position.

A relay 130 is connected between computer 103 and relay 75a through armature 127 of relay 125. When the computer 103 is off and there is no brake load as indicated by the armature 127 being in the position shown, and when further, the main pump computer 60 is off as sensed by the absence of voltage on the coil of relay 75a, then relay 130 grounds coil 135 of relay 136 to short circuit the output of amplifier 80 to thereby prevent drift of indicator 14.

In order to simulate the flow of energy from the main accumulator to the auxiliary accumulator, as demanded by hydraulic circuit conditions, a phase selector system, designated by reference character 50, is provided. Here a diode bridge comprising diodes 21, 22, 23 and 24 is connected between a source of negative phased A.C. voltage and the mid-point of the junction of resistors 25 and 26a, which respectively are connected to potentiometer arms 101 and 46. The resistance windings 100 and 45a, have oppositely phased voltages of equal magnitude applied thereto whereby the positions of the several arms—which reflect the positions of shafts 33 and 34—derive voltages of mutually opposing sense and in respective magnitude corresponding to each particular servo shaft. The output of the diode bridge is connected to conductors 26 and 27 which respectively serve as inputs to summing amplifiers 66 and 80 through resistors 72, 73 and 84, 85.

If we assume that all other inputs to amplifier 80, except those at resistors 84, 85 and 81 are zero and the arms 101 and 46 apply equal and opposite voltages through resistors 25 and 26a, then zero volts appear at the junction of diodes 21 and 22 and the —50 v. A.C. is coupled to input resistors 84 and 85 of amplifier 80 and to resistors 71 and 72 of amplifier 66. That is, the negative voltage is transmitted through diode 23 to input resistor 84. A positive 50 v. A.C. signal is coupled through a diode pair 140 to resistor 81. Diodes 140 introduce an attenuation characteristic to balance the same characteristic in the bridge diodes. Since resistors 84, 85 and 81 are of equal value, the resulting voltage at amplifier 80 will be zero in this condition. It is clear that a negative phase A.C. voltage whose value is less than 50 v. at the junction of diodes 21 and 22 will have no effect at input resistors 84 and 85 because diodes 21 and 22 will not conduct because of their fixed biasing. When a positive phase A.C. signal is applied at the junction of diodes 21 and 22, the effective voltage at input resistors 84 and 85 will be —50 volts A.C. plus the positive signal from the junction of diodes 21 and 22. The resultant voltage at amplifier 80 will be the sum of: +50 v., —50 v. and the positive phase A.C. signal from the junction of diodes 21 and 22. This sum results in a voltage input to amplifier 80 that is proportional to the positive phase A.C. signal at diode junctions 21 and 22. From the above description it can be seen that the resultant voltage to amplifier 80 will be zero until a positive phase voltage appears at the junction of diodes 21 and 22.

Since amplifier 80 is used as the servo amplifier of the brake system, the brake accumulator pressure shaft will not decrease when the main shaft decreases since, if the simulated main pressure is lower than the brake accumulator pressure, a negative phase will appear at the junction of diodes 21 and 22. If, however, the brake accumulator pressure shaft position is lower than the main hydraulic pressure shaft, a positive phase A.C. voltage will appear at the junction of diodes 21 and 22 and the brake accumulator pressure shaft will be driven in the increasing direction through the diode bridge until its position balances the main brake accumulator pressure shaft.

A positive phased 50 v. A.C. is coupled to input resistor 71 of amplifier 66 through diode pair 142. As explained above, this input normally cancels the negative 50 v. A.C. applied to input resistors 72 and 73. When an unbalance between the respective positions of arms 46 and 101 occurs, whereby arm 46 derives a higher voltage than arm 101, a positive voltage appears at the junction of diodes 21 and 22 and is applied to input resistors 72 and 73. The summing amplifier 66 inverts the phase so that it becomes a negative voltage on conductor 75 to drive the main shaft in a simulated pressure decreasing direction. The unbalance between the accumulator shafts could occur for example if the instructor introduced a voltage from his control to drive the simulated brake indicator in a pressure decreasing direction or in normal brake operation, as previously explained.

The operation of this system is as follows:

When the pilot turns on the simulated main hydraulic pump and also turns on the auxiliary pump, the computers 60 and 103 derive voltages which are applied to their respective summing amplifiers 37 and 80 to drive servo systems 35 and 36 so that the shafts, through synchros 31 and 32, move the indicator in a pressure increasing direction. When the shafts have driven the movable elements of indicators 13 and 14 to the normal position of full pressure, then the system is ready to operate. During training flight the simulated main system hydraulic loads are applied through resistors 69 and 70 to summing amplifier 66 which adds the several loads together thereby deriving a negative voltage representing $$-\frac{dP}{dt}$$

which is applied to the resistance winding 42 of potentiometer 41. The position of wiper arm 43 as driven by shaft 33 determines the voltage applied to conductor 44 which represents $$-\frac{dP}{dt}$$

and is transmitted through resistor 62 to summing amplifier 37 where it tends to drive motor 38 in a simulated pressure decreasing direction. The higher the position of wiper arm 43 on resistance winding 42 the greater the derived voltage on conductor 44, which closely approximates the hydraulic system behaviour. The voltage output of computer 60 tends to restore shaft 33 to a predetermined position. When wiper arm 52 approaches the top of resistance winding 53 a minus voltage is applied through conductor 55 and scaling resistor 63 into the summing amplifier to thereby balance all positive phase inputs and stop the shaft in that position. This prevents the motor from grinding in its stops. The same operation is true in the reversed direction. If for example, the series of loads are applied into summing amplifier 66 when the computer 60 is off, and the shaft 33 is driven almost to the full downward position, a positive phase is applied to wiper arm 52 and to the input of summing amplifier 37, whereby it cancels the input and the shaft remains in the simulated low pressure position without grinding until the main pump computer voltage, if turned on, drives the motor to the pressure increasing position.

If the simulated auxiliary pump is not turned on when the simulated main pump is turned on then shaft 33 is driven to a position representing increasing pressure and selector net work 50 senses a differential in position between shafts 34 and 33 through the signal differential received from potentiometers 45 and 99. The net work then derives a voltage as previously explained which is applied as an input to amplifier 80 through resistors 84 and 85 to drive shaft 34 in a simulated pressure increasing direction. The voltage also appears as an input to amplifier 66 to derive an input to amplifier 37 which tends to drive shaft 33 in a simulated pressure decreasing direction. However, the magnitude of the input signal from computer 60 being of opposite sign from the signal from amplifier 66 prevails over this signal and the shaft 33 turns to a "full" pressure indication after a predetermined time.

As previously described brake loads are derived through relay 120 and condensors 114 and 115. The negative phase voltage from the brakes is applied to the resistance winding 93 of potentiometer 92 and through wiper arm 91 and resistor 86 to the input of summing amplifier 80 which tends to drive motor 88 in a pressure decreasing direction for a length of time determined by the capacitor 115 and/or 114—relay 118 combination.

The relays 130, 75 and 76 operate relays 136 and 65 to prevent drift of the indicators when all pumps and loads are off.

If the auxiliary pump computor is off and the brakes are applied then shaft 34 will move to a simulated pressure decreasing direction, then a differential in the voltages applied to the junction of diodes 21 and 22 will result and the bridge will pass the resultant positive voltage to run shaft 34 in a pressure increasing direction and shaft 33 in a pressure decreasing direction until balance of the shafts is again attained.

Another system characteristic is obtainable if, for example, the simulated main pump computer 60 is off, when the auxiliary pump computor 103 is on and a hydraulic load is called for. The pressure dips in the indicators will be large, and a longer time will be required for hydraulic operaiton. Thus, by proper scaling of the auxiliary pump computer 103 and simulated main pump computer 60 signal inputs the dynamics of any hydraulic system may be simulated.

If after the simulated aircraft lands, all pumps fail, a predetermined number of brake applications may be obtained by the scaling of resistors 95 and 86. The brake accumulator will, at the end of each brake application, indicate a constant lower pressure as determined by the desired simulated accumulator characteristics.

Having described a preferred embodiment of the present invention, it is to be understood that although specific terms and examples are employed, they are used in a generic and descriptive sense and not for purposes of limitation; the scope of the invention being set forth in the following claims.

What is claimed is:

1. Apparatus for simulating to a trainee the operation of an aircraft hydraulic pressure system of the type having an oil pump supplying loads through a pair of accumulators interconnected for non-reversible flow from a main to a brake accumulator to equalize the pressure therebetween, comprising in combination a main pump computer operable by the trainee for generating a main pump potential representative of the rate of increase of main accumulator pressure resulting from the operation of a main hydraulic pump, an auxiliary pump computer operable by the trainee for generating an auxiliary pump potential representative of the rate of increase of auxiliary accumulator pressure resulting from the operation of an auxiliary hydraulic pump, a first summing amplifier having inputs thereto representative of main accumulator pressure changes, a first mechanical shaft whose angular position represents main accumulator pressure, a first servo motor connected to the first mechanical shaft and responsive to the output of the first summing amplifier whereby the first motor drives the first shaft to a position analagous to the main accumulator pressure, a main system pressure indicator, a first synchro interconnected between the said main indicator and the said first shaft so as to activate the main indicator in accordance with the position of the first shaft so that the indicator presents to the trainee an indication of the main accumulator pressure, a second summing amplifier having inputs thereto representative of auxiliary accumulator pressure changes, a second mechanical shaft whose angular position represents auxiliary accumulator pressure, a second servo motor connected to the second mechanical shaft and responsive to the output of the second summing amplifier whereby the second motor drives the second shaft to a position analogous to the auxiliary accumulator pressure, an auxiliary system pressure indicator, a second synchro interconnected between the said auxiliary indicator and the said second shaft so as to activate the auxiliary indicator in accordance with the position of the second shaft so that the indicator presents to the trainee an indication of the auxiliary accumulator pressure, selector comparison means responsive to voltages from poteniometers on both the main and auxiliary shafts for generating a differential potential whereby the auxiliary accumulator pressure shaft is driven to indicate increasing pressure when the main pressure shaft indicates a greater pressure than the auxiliary pressure shaft but whereby the converse is not true.

2. Apparatus for simulating to a trainee the operation of an aircraft hydraulic pressure system of the type having an oil pump supplying loads through a pair of accumulators interconnected for non-reversible flow from a main to a brake accumulator to equalize the pressure therebetween, comprising in combination a main pump computer operable by the trainee for generating a main pump potential representative of the rate of increase of main accumulator pressure resulting from the operation of a main hydraulic pump, an auxiliary pump computer operable by the trainee for generating an auxiliary pump potential representative of the rate of increase of auxiliary accumulator pressure resulting from the operation of an auxiliary hydraulic pump, a first summing amplifier having inputs thereto representative of main accumulator pressure changes, a first mechanical shaft whose angular position represents main accumulator pressure, the said shaft having potentiometers mounted thereon, a first servo motor connected to the first mechanical shaft and responsive to the output of the first summing amplifier whereby the first motor drives the first shaft to a position analogous to the main accumulator pressure, a main system pressure indicator, a first synchro interconnected between the said main indicator and the said first shaft so as to activate the main indicator in accordance with the position of the first shaft so that the indicator presents to the trainee an indication of the main accumulator pressure, a second summing amplifier having inputs thereto representative of auxiliary accumulator pressure changes, a second mechanical shaft whose angular position represents auxiliary accumulator pressure, the said shaft having potentiometers mounted thereon, a second servo motor connected to the second mechanical shaft and responsive to the output of second summing amplifier whereby the second motor drives the second shaft to a position analogous to the auxiliary accumulator pressure, an auxiliary system pressure indicator, a second synchro interconnected between the said auxiliary indicator and the said second shaft so as to activate the auxiliary indicator in accordance with the position of the second shaft so that the indicator presents to the trainee an indication of the auxiliary accumulator pressure, selector comparison means responsive to voltages from potentiometers on both the main and auxiliary shafts for generating a differential potential whereby the auxiliary accumulator pressure shaft is driven to indicate increasing pressure when the main pressure shaft indicates a greater pressure than the auxiliary pressure shaft but whereby the converse is not true, third summing amplifier means for combining potentials representative of main system hydraulic loads, the output of said third amplifier being applied to a potentiometer on the said main hydraulic pressure shaft, brake load means for generating a brake potential analogous to the pressure expended in the operation of brakes and means interconnecting said potential with a potentiometer on the auxiliary hydraulic pressure shaft, the inputs to the said first summing amplifier comprising the said main pump potential, auxiliary pump potential and main system load potential, the first two potentials being of such a phase as to tend to activate the main pressure shaft in an increasing pressure direction and the main system load potential is of such a phase as to tend to activate the main pressure shaft in a decreasing pressure direction, the actual direction of motion depending on the relative amplitudes of the potentials as summed by the said first summing amplifier, and the inputs to the said second summing amplifier comprising the said auxiliary pump potential, differential potential and brake potential whereby the amplifier output is analogous to a change in auxiliary pressure so that the auxiliary shaft is activated in accordance with the relative amplitude of the inputs and whereby a greater pressure in the main system will cause the auxiliary pressure shaft to move to indicate an increasing pressure which, in turn, will cause the selector comparison means to provide a potential to cause the main pressure shaft to move in a decreasing pressure direction to thereby simulate the equalizing of pressure between the main and auxiliary accumulators as occurs in an actual aircraft hydraulic pressure system.

References Cited in the file of this patent

UNITED STATES PATENTS

| | | |
|---|---|---|
| 2,510,500 | Hayes et al. | June 6, 1950 |
| 2,516,803 | Rippere | July 25, 1950 |
| 2,519,698 | Pearsall | Aug. 22, 1950 |